(12) United States Patent
Johnson

(10) Patent No.: US 7,058,799 B2
(45) Date of Patent: Jun. 6, 2006

(54) APPARATUS AND METHOD FOR CLOCK DOMAIN CROSSING WITH INTEGRATED DECODE

(75) Inventor: Brian Johnson, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 627 days.

(21) Appl. No.: 09/884,174

(22) Filed: Jun. 19, 2001

(65) Prior Publication Data

US 2002/0194520 A1 Dec. 19, 2002

(51) Int. Cl.
*G06F 12/00* (2006.01)

(52) U.S. Cl. .................. 713/40; 713/401; 712/208; 711/200; 710/260; 710/52; 365/230.06

(58) Field of Classification Search ........ 713/400–401; 710/260, 52; 712/208; 365/230.06; 711/200
See application file for complete search history.

(56) References Cited

U.S. PATENT DOCUMENTS

| | | | | |
|---|---|---|---|---|
| 5,425,061 A * | 6/1995 | Laczko et al. | ............... | 375/371 |
| 5,777,931 A * | 7/1998 | Kwon et al. | ................ | 365/200 |
| 5,784,639 A * | 7/1998 | Abramson | ................... | 712/23 |
| 6,000,022 A * | 12/1999 | Manning | .................... | 711/167 |
| 6,272,070 B1* | 8/2001 | Keeth et al. | ............. | 365/233.5 |
| 6,279,090 B1 | 8/2001 | Manning | .................... | 711/167 |
| 6,304,510 B1 | 10/2001 | Nobunaga et al. | ..... | 365/230.06 |
| 6,333,893 B1 | 12/2001 | Keeth et al. | ................ | 365/233 |
| 6,338,127 B1 | 1/2002 | Manning | .................... | 711/167 |
| 6,366,991 B1 | 4/2002 | Manning | .................... | 711/167 |
| 6,414,903 B1 | 7/2002 | Keeth et al. | ................ | 365/233 |
| 6,434,081 B1 | 8/2002 | Johnson et al. | ............ | 365/233 |
| 6,434,684 B1 | 8/2002 | Manning | .................... | 711/167 |
| 6,445,643 B1 | 9/2002 | Keeth | ......................... | 365/233 |
| 6,449,674 B1* | 9/2002 | Yun et al. | .................... | 710/260 |
| 6,587,804 B1 | 7/2003 | Johnson et al. | ............. | 702/107 |
| 6,605,970 B1 | 8/2003 | Keeth et al. | ................ | 327/157 |
| 6,606,041 B1 | 8/2003 | Johnson et al. | ............. | 341/120 |
| 6,658,523 B1 | 12/2003 | Janzen et al. | ............... | 711/105 |
| 6,674,378 B1 | 1/2004 | Johnson et al. | ............. | 341/120 |
| 6,678,205 B1 | 1/2004 | Johnson et al. | ............. | 365/233 |
| 6,687,185 B1 | 2/2004 | Keeth et al. | ................. | 365/233 |
| 6,725,388 B1* | 4/2004 | Susnow | ...................... | 713/400 |
| 6,747,997 B1* | 6/2004 | Susnow et al. | ............. | 370/509 |
| 6,848,013 B1* | 1/2005 | Suh et al. | ...................... | 710/65 |
| 2003/0017881 A1 | 6/2003 | Johnson et al. | ............. | 365/233 |

OTHER PUBLICATIONS

Dally, William J., et al., "Digital Systems Engineering", Cambridge University Press, Cambridge, UK—ISB4 0-521-59292-5 (66), pp. 477–479.

* cited by examiner

*Primary Examiner*—A. Elamin
(74) *Attorney, Agent, or Firm*—Wong, Cabello, Lutsch, Rutherford & Brucculeri

(57) ABSTRACT

An apparatus and method for transferring signals between timing domains. The apparatus includes a receiver for receiving signals operative in a first timing domain, a decoder for at least partially decoding the signals to generate at least one decoded signal, and an output timing register for outputting the at least one decoded signal in a second timing domain. The signals transferred from the first timing domain to the second timing domain may include, for example, command and/or address signals. The first and second timing domains need not have any predetermined phase relationship. By at least partially decoding the signals during the transfer between the first and the second timing domains, the latency introduced by the timing domain transfer is employed for a useful purpose.

53 Claims, 6 Drawing Sheets

APPARATUS AND METHOD FOR CLOCK DOMAIN CROSSING WITH INTEGRATED DECODE

FIELD OF THE INVENTION

The present invention relates to the field of digital circuits. More particularly, this invention relates to digital circuits in which a plurality of signals that need to be at least partially decoded are transferred from a first timing domain to a second timing domain.

BACKGROUND OF THE INVENTION

Certain digital circuits employ a first-in first-out (FIFO) synchronizer to decouple transmitter from receiver timing. For example, certain dynamic random access memory (DRAM) devices use a FIFO synchronizer to transfer command/address signals timed to a command capture clock to the timing domain of an array/core logic clock. An example of a FIFO synchronizer circuit is described by William J. Dally and John W. Poulton in "Digital Systems Engineering", Cambridge University Press, Cambridge, U.K. 1998.

One impact of a FIFO synchronizer is that there is a latency associated with the transfer of the command/address signals from the sending clock domain to the receiving clock domain. The length of this transfer latency is dependent upon the clock frequency, and the timing relationship between the two clock signals. The frequency of the sending clock signal is typically the same as that of the receiving clock signal. However, there is no predetermined phase relationship between the sending and the receiving clock signals.

In digital circuits that employ a FIFO synchronizer to transfer command/address signals between clock domains, these command/address signals are transferred directly, with only the timing of these signals being modified. Thus, the latency that is associated with the transfer of these signals is not employed for any useful purpose. In other words, the transfer latency represents wasted time. Thus, it would be advantageous to provide an apparatus and a method for transferring signals between timing domains that makes the latency associated with performing the transfer available for performing a useful purpose.

SUMMARY OF THE INVENTION

In accordance with one aspect of the present invention, a FIFO synchronizer with integrated decode is provided for transferring signals such as command and/or address signals between timing domains. The FIFO synchronizer with integrated decode partially or fully decodes the signals during the transfer, instead of directly transferring the signals. The FIFO synchronizer with integrated decode advantageously uses the transfer latency for the purpose of decoding the signals being transferred. In one embodiment, a dynamic random access memory (DRAM) device includes a FIFO synchronizer with integrated decode for the purpose of transferring signals from a sending to a receiving clock domain.

In accordance with one aspect of the invention, an apparatus for transferring signals between timing domains includes a receiver for receiving signals operative in a first timing domain, a decoder coupled to the receiver for at least partially decoding the signals to generate at least one decoded signal, and an output timing register coupled to the decoder for outputting the at least one decoded signal in a second timing domain.

In accordance with another aspect of the invention, a method of transferring signals between timing domains of a digital circuit includes receiving signals operative in a first timing domain, at least partially decoding the signals to generate at least one decoded signal, and outputting the at least one decoded signal in a second timing domain.

These and various other features as well as advantages which characterize the present invention will be apparent to a person of ordinary skill in the art upon reading the following detailed description and reviewing the associated drawings.

DESCRIPTION OF THE PREFERRED EMBODIMENTS

Figure 1:
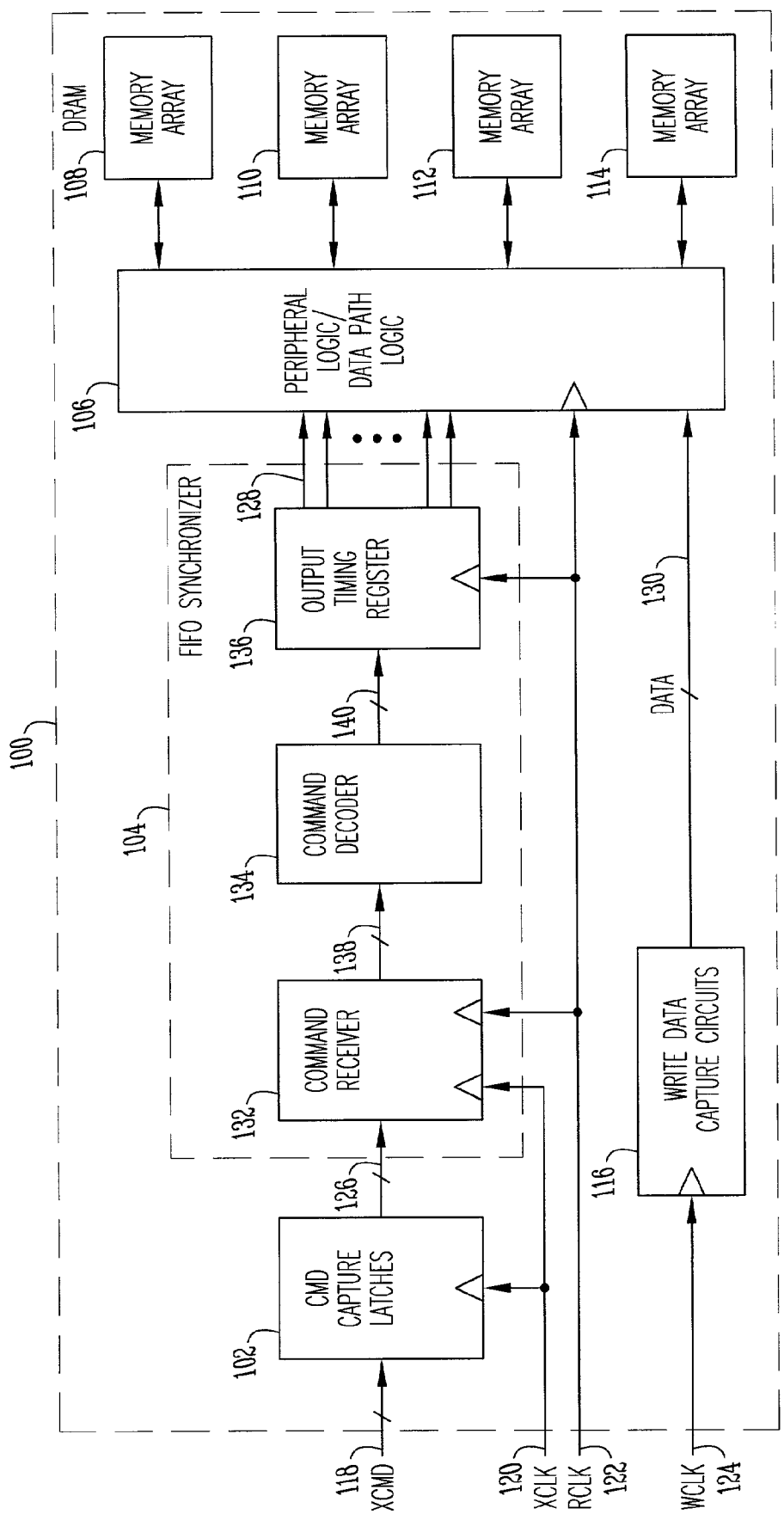
FIG. 1 is a schematic block diagram of an exemplary digital circuit in which signals are at least partially decoded while being transferred from a first timing domain to a second timing domain, in accordance with one embodiment of the present invention.

In the following detailed description, reference is made to the accompanying drawings, which form a part hereof, and in which is shown, by way of illustration, specific embodiments in which the present invention may be practiced. In the drawings, like numerals refer to like components throughout the views. These embodiments are described in sufficient detail to enable those of ordinary skill in the art to practice the present invention, and it is to be understood that these embodiments may be combined, or that other embodiments may be utilized and that structural, logical and electrical changes may be made without departing from the spirit and the scope of the present invention. The following detailed description is, therefore, not to be taken in a limiting sense, and the scope of the invention is defined by the appended claims and their equivalents.

Referring to FIG. 1, an exemplary digital circuit 100 in which signals are at least partially decoded while being transferred from a first timing domain to a second timing domain in accordance with one embodiment of the present invention is illustrated. In this example, digital circuit 100 includes a dynamic random access memory (DRAM) device. However, circuitry for at least partially decoding signals as those signals are transferred between two timing domains may also be used in other types of digital circuits, such as in DRAM devices having other configurations, other types of memory devices (e.g., RAM, SRAM, synchronous FLASH memory, ROM, PROM, EPROM, EEPROM, etc.), logic devices (e.g., communications chips), etc. In general, circuitry for use in at least partially decoding signals as those signals are transferred between clock timing domains may be used in any digital circuit application where a group of signals that needs to be partially or fully decoded is transferred from a first timing domain to a second timing domain.

In this example, digital circuit 100 is a DRAM integrated digital circuit including command capture latches 102, a first-in first-out (FIFO) synchronizer with integrated decode 104, peripheral logic/data path logic 106, memory arrays 108, 110, 112 and 114, and write data capture circuits 116. Digital circuit 100 also includes clock, command and data transceiver circuits (not shown). The input signals to circuit 100 include a plurality of command signals (XCMD) 118, and three clock signals including a cross clock signal (XCLK) 120, a read clock signal (RCLK) 122, and a write clock signal (WCLK) 124. Other input/output signals to circuit 100 include bidirectional data signals (not shown).

In this embodiment, cross clock signal (XCLK) 120, read clock signal (RCLK) 122 and write clock signal (WCLK) 124 all operate at the same frequency. However, it is assumed these clock signals have arbitrary phase relationships with each other. In other words, there is no predetermined phase relationship between XCLK, RCLK and WCLK. In other embodiments, there may a phase relationship between two or more of the clocks.

Command signals (XCMD) 118 are coupled as input signals to command capture latches 102, and cross clock signal (XCLK) 120 is coupled as a clock signal to command capture latches 102. In this embodiment, command signals (XCMD) are latched into the command capture latches 102 in response to a transition (e.g., a positive or negative edge) of cross clock signal (XCLK) 120. Thus, command signals (XCMD) 118 are operative in the command capture timing domain that is defined by cross clock signal (XCLK) 120.

The latched command signals 126 that are output from command capture latches 102 are coupled as input signals to FIFO synchronizer with integrated decode 104, and cross clock signal (XCLK) 120 and read clock signal (RCLK) 122 are coupled as clock signals to FIFO synchronizer with integrated decode 104. As described in further detail below, FIFO synchronizer with integrated decode 104 partially or completely decodes the command signals 126 while transferring these signals from the command capture timing domain defined by cross clock signal (XCLK) 120 to the timing domain defined by read clock signal (RCLK) 122. The output signals from FIFO synchronizer with integrated decode 104, which are now at least partially decoded and in the timing domain defined by read clock signal (RCLK) 122, are designated in FIG. 1 by the reference numeral 128.

The at least partially decoded command signals 128 are coupled as control signals to peripheral logic/data path logic 106, and read clock signal (RCLK) 122 is coupled as a clock signal to peripheral logic/data path logic 106. Peripheral logic/data path logic 106 is also coupled to data signals 130, which are output from write data capture circuits 116 in response to write clock signal (WCLK) 124. Peripheral logic/data path logic 106 uses at least partially decoded command signals 128 and data signals 130 to control accesses to memory arrays 108–114. These accesses will depend on the configuration of digital circuit 100 and may include, for example, read accesses, write accesses, refresh accesses and other types of accesses of memory arrays 108–114. Peripheral logic/data path logic 106 uses read clock signal (RCLK) 122 to perform the accesses in the read clock domain.

In the embodiment of FIG. 1, FIFO synchronizer with integrated decode 104 includes a command receiver 132, a command decoder 134 coupled to command receiver 132, and an output timing register 136 coupled to command decoder 134. The latched command signals 126 are coupled as input signals to command receiver 132, and cross clock signal (XCLK) 120 and read clock signal (RCLK) 122 are coupled as clock signals to command receiver 132. As described in detail below, command receiver 132 receives the latched command signals 126, which are operative in the command capture timing domain defined by cross clock signal (XCLK) 120, and partially transfers or synchronizes signals 126 to the read clock domain defined by the read clock signal (RCLK) 122. The output signals from command receiver 132 are designated by the reference numeral 138.

Output signals 138 from command receiver 132 are coupled as input signals to command decoder 134, which partially or fully decodes signals 138 to generate at least partially decoded command signals 140. The decoding that is performed by command decoder 134, which is described further below, depends on the requirements of peripheral logic/data path logic 106, and the configuration of circuit 100. At least partially decoded command signals 140 are then coupled as input signals to output timing register 136, and read clock signal (RCLK) 122 is coupled as a clock signal to output timing register 136. As is described below, output timing register 136 synchronizes at least partially decoded command signals 140 to the read timing domain of read clock signal (RCLK) 122.

In the embodiment of FIG. 1, FIFO synchronizer with integrated decode 104 includes command receiver 132 and command decoder 134 for receiving and partially or fully decoding the command signals that are provided by XCMD signals 118. In another embodiment, XCMD signals 118 include only address signals that are partially or fully decoded while being transferred between timing domains. In yet another embodiment, XCMD signals 118 include a combination of both command and address signals that are partially or fully decoded, alone or together, while being transferred between two timing domains. In still other embodiments, XCMD signals 118 also include one or more other types of signals that are transferred between two timing domains and are partially or fully decoded. XCMD signals 118 may include a combination of these different signal types. For example, XCMD signals 118 may include a combination of command, address and data signals. For convenience, this specification assumes that XCMD signals 118 include only command signals, unless stated otherwise. It should be understood, however, that signals 118 can include any combination of command, address, data and other signals, with appropriate modifications made to the components of circuit 100 shown in FIG. 1.

Figure 2:
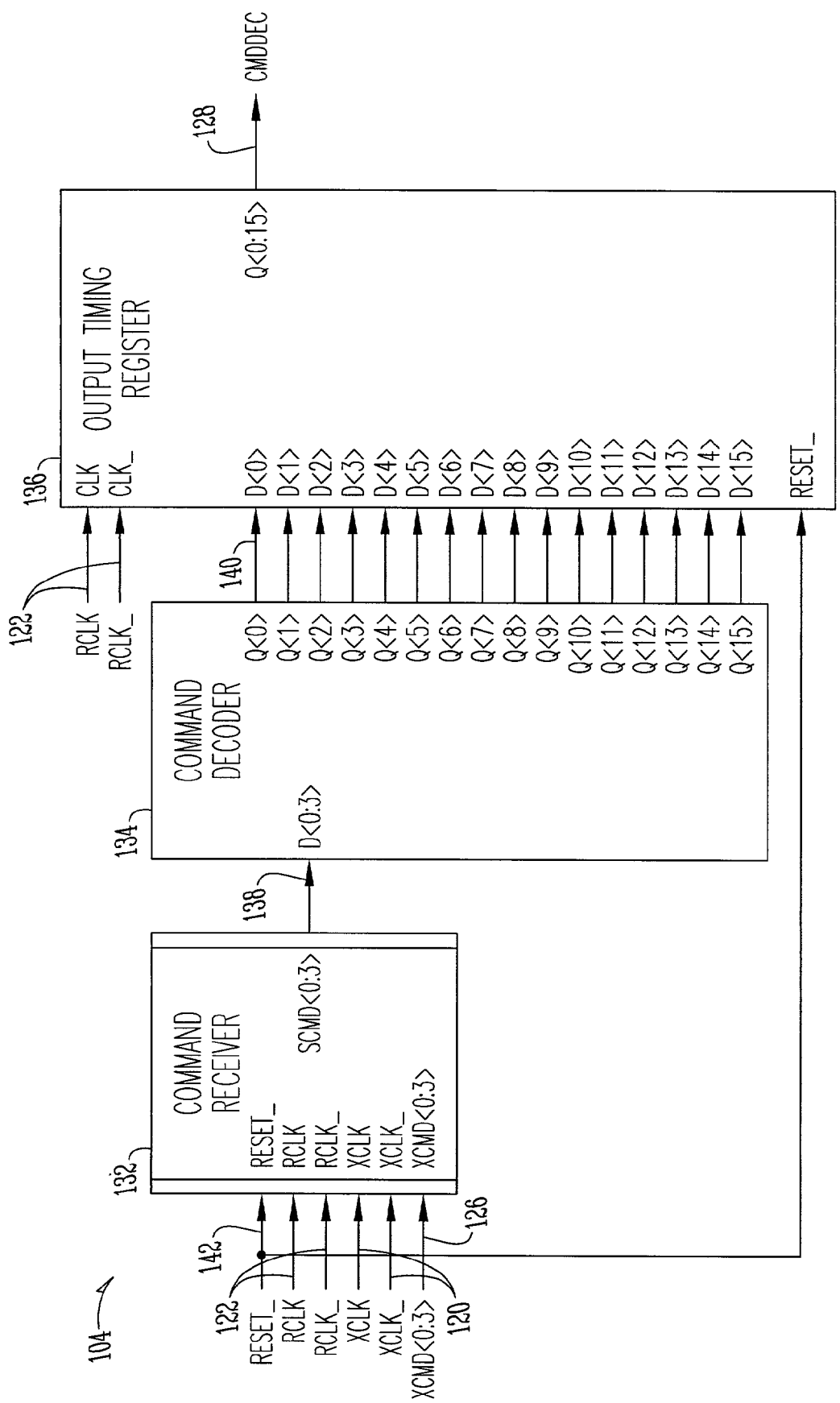
FIG. 2 is a schematic diagram of the first-in first-out (FIFO) synchronizer with integrated decode shown in FIG. 1, in accordance with one embodiment of the invention.

Referring to FIG. 2, FIFO synchronizer with integrated decode 104 in accordance with one embodiment of the invention is shown in further detail. In this embodiment, FIFO synchronizer with integrated decode 104 is particularly appropriate for use in high-speed DRAM integrated circuit devices operating at fast clock frequencies where the use of differential clock signals is advantageous. For example, this embodiment is suitable for high-speed DRAM devices operating at clock frequencies of 400 MHz, 500 MHz or even higher. It should be understood, however, that this embodiment can also be used for DRAM devices which operate at other clock speeds, either higher or lower than these clock frequencies, and can also be used for other types of memory or logic devices.

In this embodiment, command receiver 132 receives input signals including a reset signal (RESET_) 142, a pair of differential read clock signals (RCLK and RCLK_) 122, a pair of differential cross clock signals (XCLK and XCLK_) 120, and four latched command signals (XCMD<0:3>) 126. Note that an underscore "_" after a signal name indicates that the signal is active low, and "<0:n>" after a signal name indicates the width of the signal. Thus, for example, RESET_ indicates the reset signal is active low, while XCMD<0:3> indicates that there are four command bits being input. Also note that the command signals input by XCMD<0:3> can correspond to any four command signals, with the "<0:3>" not implying order, as long as the <0:3> notation is applied consistently across the circuits. For example, XCMD<0> corresponds with SCMD<0> and D<0>.

In this embodiment, XCLK and XCLK_ represent a cross clock and an inverted cross clock, and RCLK and RCLK_ represent a read clock and an inverted read clock. Each pair of these clock signals thus forms a pair of differential clock signals. In digital circuits which use differential clock signals, data or signals are captured at the time that the differential clocks cross. It is noted that differential clock signals advantageously reduce clock timing problems in high-speed digital circuits. For example, differential clock signals result in less clock noise, and in an improved duty cycle for the clock. For these reasons, differential clock signals such as those shown in FIG. 2 are used for high-speed parts such as the high-speed DRAM that is shown in FIG. 1. However, it should be understood that the present system can be used for transferring signals between any two timing domains that can be defined by any pair of two separate clock signals, regardless of whether those clock signals are differential clock signals or single-ended clock signals.

Command receiver 132 receives latched command signals (XCMD<0:3>), which are operative in the command capture timing domain defined by differential cross clock signals (XCLK and $XCLK_{13}$) 120, and partially transfers or synchronizes signals 126 to the read clock domain defined by differential read clock signals (RCLK and RCLK_) in a manner which will be described in further detail below in reference to FIG. 3. The output signals from command receiver 132 are designated in FIG. 2 by SCMD<0:3> signals 138. Signals 138, however, are not yet fully synchronized to the RCLK timing domain because they have not been processed by output timing register 136, which is clocked by RCLK.

Command decoder 134 receives SCMD<0:3> signals 138 from command receiver 132, and decodes signals 138 to generate at least partially decoded command signals 140. In the embodiment of FIG. 2, command decoder 134 is a four-bit decoder that, for each input (SCMD<0:3>) 138, asserts a logic "1" at one and only one output (Q<0:15>) 140. Thus, for example, if SCMD<0:3> 138 equals "3" (i.e., a binary 0011), command decoder 134 generates a logic "1" at Q<3> and generates a logic "0" at the other 15 Q<n> outputs 140. In other embodiments, command decoder 134 is an n-bit decoder that generates $2^n$ outputs, where n equals 1, 2, etc. As noted above, the decoding performed by command decoder 134 depends on the requirements of peripheral logic/data path logic 106 (FIG. 1), and on the configuration of digital circuit 100. Thus, in other embodiments, command decoder 134 will decode the SCMD<0:3> signals using other logic, as described below.

Output timing register 136 receives input signals including the at least partially decoded command signals 140 from command decoder 134, the differential read clock signals (RCLK and RCLK_) 122, and reset signal (RESET_) 142. Using these signals, output timing register 136 synchronizes the at least partially decoded command signals 140 to the timing domain of read clock signals (RCLK and RCLK_) 122 to generate at least partially decoded command signals (CMDDEC) 128. Register 136 includes, in one embodiment, a 16-bit register that uses read clock signals (RCLK and RCLK_) 122 as a differential clock signal. In other embodiments, register 136 is an n-bit register, with n being the number of output signals from decoder 134. Note that, in generating CMDDEC signals 128, command signals (XCMD<0:3>) have been at least partially decoded while being transferred from the command capture timing domain to the read timing domain.

FIFO synchronizer with integrated decode 104 thus includes a FIFO synchronizer which has a front end including command receiver 132, and a back end including output timing register 136. The front end captures or receives signals (XCMD<0:3>) operative in a first timing domain defined by differential cross clock signals XCLK and XCLK_. The back end synchronizes at least one decoded signal (decoded command signals 140) to a second timing domain defined by differential read clock signals RCLK and RCLK_. Command decoder 134 is coupled between the front and back ends of the synchronizer, and is used for decoding the captured signals (SCMD<0:3>) to generate the at least one decoded signal (decoded command signals 140). The FIFO synchronizer with integrated decode 104 thus transfers the XCMD<0:3> signals from the first to the second timing domain while decoding these XCMD signals to generate the CMDDEC<0:15> signals.

Figure 3:
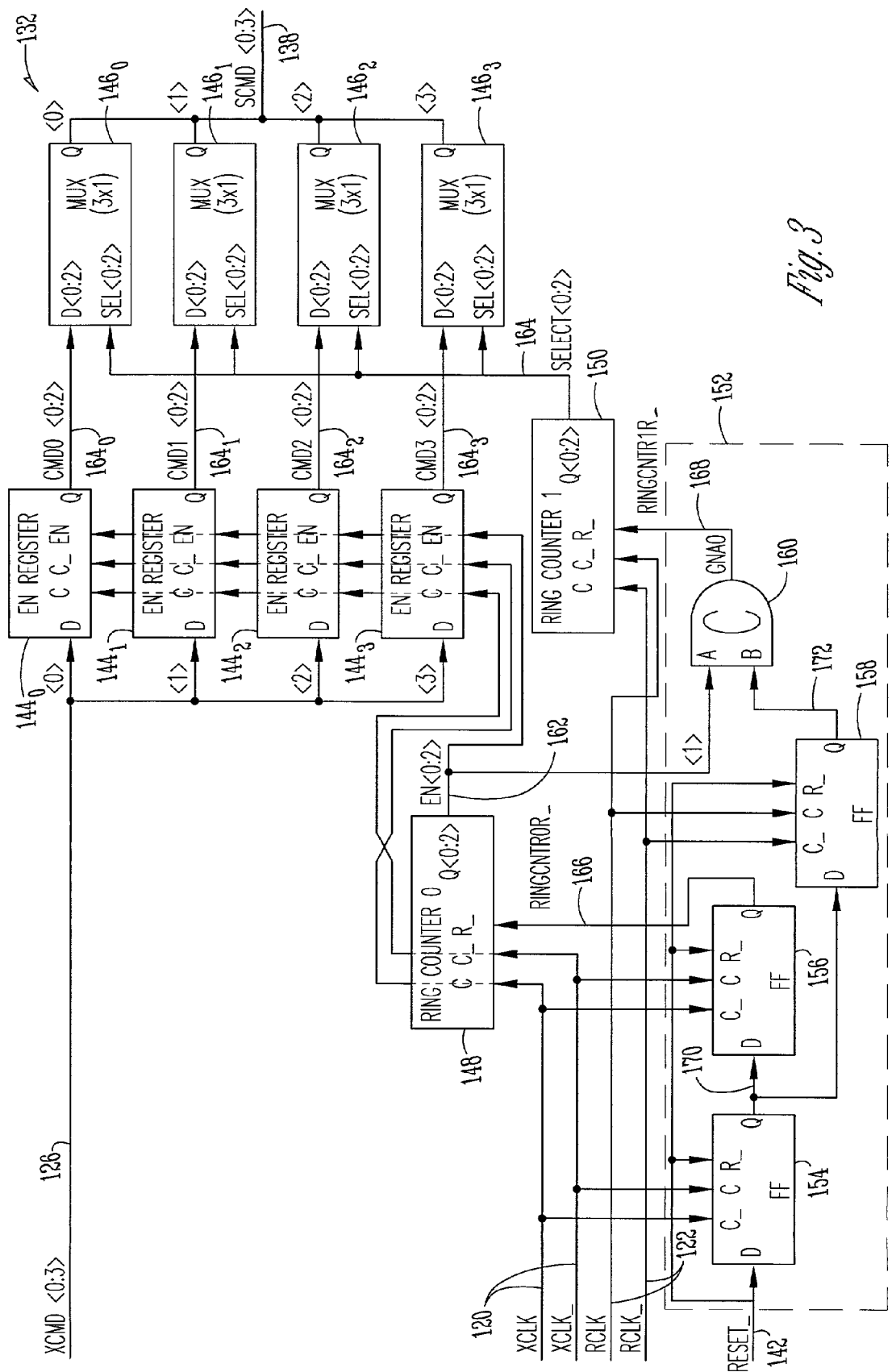
FIG. 3 is a schematic diagram of one embodiment of the command receiver of the FIFO synchronizer with integrated decode shown in FIG. 2.

Referring to FIG. 3, command receiver 132 is shown in further detail according to one embodiment of the invention. In this embodiment, command receiver 132 includes multiple-bit enabled registers $144_0$, $144_1$, $144_2$ and $144_3$, multiple-input multiplexers $146_0$, $146_1$, $146_2$ and $146_3$, a first ring counter (i.e., "ring counter 0") 148, a second ring counter (i.e., "ring counter 1") 150, and a power-on reset (POR) circuit 152 which includes a first flip-flop 154, a second flip-flop 156, a third flip-flop 158, and a Muller C gate 160. Note that a Muller C gate has A and B inputs, and an output C. If A and B are both high, then C will be high. If only one of the inputs (e.g., A) then goes low, C will remain high (i.e., the high is stored). If the other input (e.g., B) then also goes low, C will then go low. At this point, both A and B are low, and output C is low. Then, if only one of the inputs (e.g., A) goes high, C will remain low (i.e., the low is stored). If the other input (e.g., B) then also goes high, C will then go high. Thus, Muller C gate 160 stores the previous state until both inputs are in the same state, at which point the output is changed to that state. If both inputs are in different states, then the output will remain in its last state.

In the embodiment of FIG. 3, command receiver 132 includes one enabled register $144_n$ and one corresponding multiplexer $146_n$ for each of the four bits of command signals (XCMD) 126. Thus, command receiver 132 includes four enabled registers $144_0$, $144_1$, $144_2$, $144_3$ and four corresponding multiplexers $146_0$, $146_1$, $146_2$, $146_3$. However, in other embodiments, there may be fewer than or greater than four command bits. For example, there may be 2, 3, 5, 6, etc. command bits. In general, if there are n command bits, then command receiver 132 will include n enabled registers and n corresponding multiplexers.

Each of multiple-bit enabled registers $144_n$ receives input signals including the nth bit of command signals (XCMD<0:3>) 126, a multiple-bit enable signal (EN<0:2>) 162, and differential cross clock signals (XCLK and XCLK_) 120. From these signals, each enabled register $144_n$ captures one bit of command signals (XCMD) 126 in the command capture timing domain, and generates a multiple-bit captured command signal for the nth command bit (CMDn<0:2>) $164_n$ which widens or stretches out the amount of time that the respective command bit is available from the point in time at which it was captured. In one embodiment, the enabled registers stretch out the amount of time the command bits are available from one cycle of the command capture clock to three cycles. In other embodiments, the command bits are stretched out for two, four or even more cycles. The manner in which each command bit is stretched out is described in reference to FIG. 4.

Figure 4:
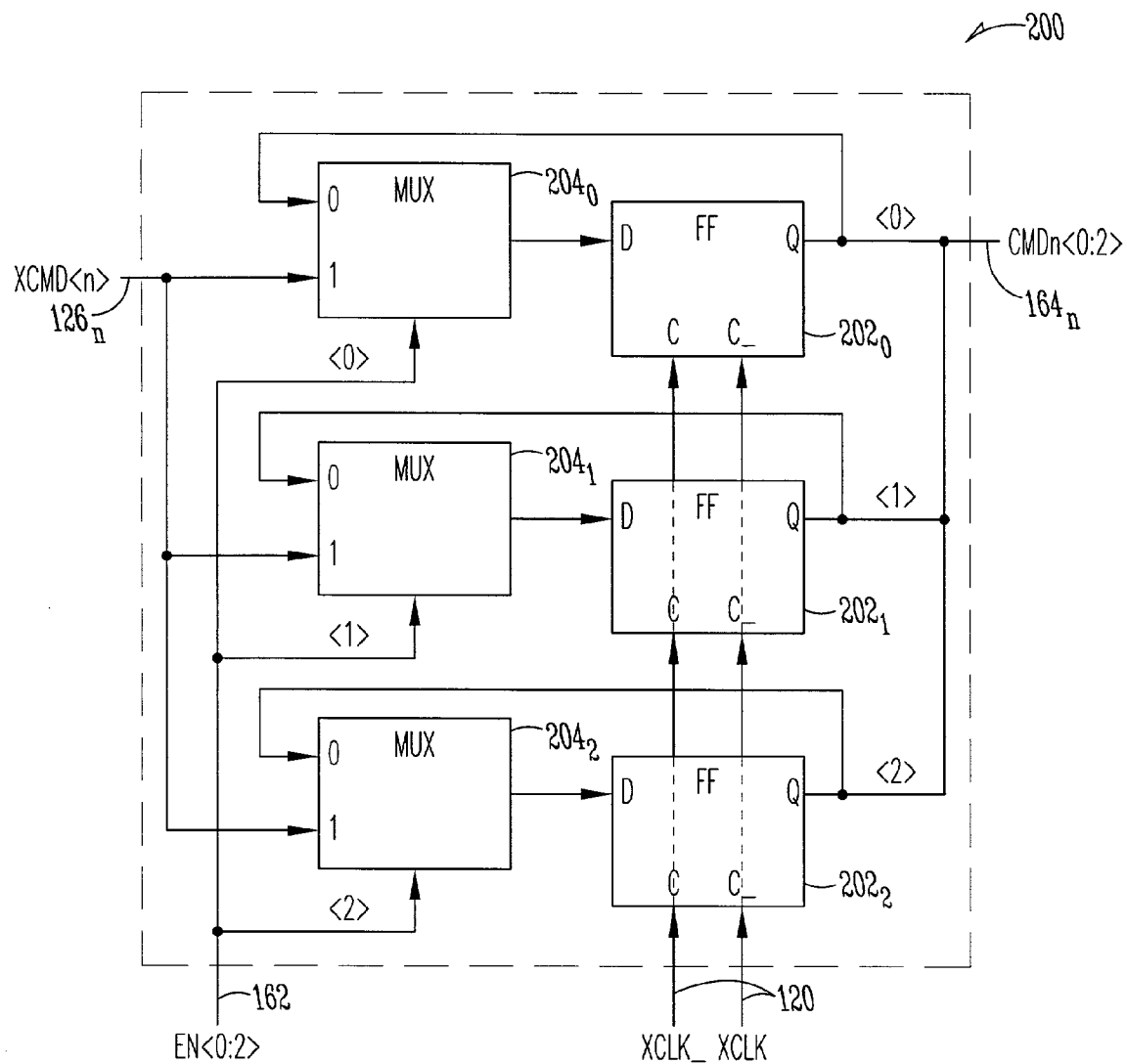
FIG. 4 is a schematic diagram illustrating each enabled register shown in FIG. 3.

Referring to FIG. 4, in one embodiment, an enabled register 200 implementing each of enabled registers $144_n$ (FIG. 3) includes three flip-flops $202_0$, $202_1$ and $202_2$, and corresponding multiplexers $204_0$, $204_1$ and $204_2$. The input signals to enabled register 200 include one bit of the command signals (XCMD<n>) $126_n$, three-bit enable signals (EN<0:2>) 162, and cross clock signals (XCLK and XCLK_) 120. The output signals from enabled register 200 are the three-bit captured command signal (CMDn<0:2>) $164_n$. In an embodiment where the command bits are stretched out for only two clock cycles, each enabled register would include only two flip-flops $202_0$ and $202_1$ and corresponding multiplexers $204_0$ and $204_1$, the enable signals would include only two bits (EN<0:1>), and the output signals would be only a two-bit captured command signal (CMDn<0:1>). Similar variations can be made to stretch out the command bits for other numbers of clock cycles, as would be apparent from this description to a person of skill in the art.

In each enabled register 200, XCMD<n> signal $126_n$ is coupled to the "1" input of each of multiplexers $204_0$, $204_1$, $204_2$, the output from each multiplexer $204_0$, $204_1$, $204_2$ is coupled to the data input of the corresponding flip-flop $202_0$, $202_1$, $202_2$, and the output of each flip-flop $202_0$, $202_1$, $202_2$ is coupled to the "0" input of corresponding multiplexer $204_0$, $204_1$, $204_2$. One bit from enable signal (EN<0:2>) 162 is coupled to the select input of each multiplexer $204_0$, $204_1$, $204_2$, and each flip-flop $202_0$, $202_1$, $202_2$ is clocked by the cross clock signals (with XCLK_ and XCLK coupled to the C and C_ inputs of the flip-flops, respectively). As shown in FIG. 3, EN<0:2> is driven by ring counter 148, which is clocked by XCLK and XCLK_. Thus, EN<0:2> successively asserts each of its bits.

When bit 0 of EN<0:2> goes high, the "1" input of multiplexer $204_0$ will be selected, and XCMD<n> will be clocked into flip-flop $202_0$ by XCLK_ and XCLK. At the same time, the "0" input of multiplexers $204_1$ and $204_2$ will be selected, and flip-flops $202_1$ and $202_2$ will hold their past values. On the next cycle of XCLK and XCLK_, bit 1 of EN<0:2> will go high, which will select the "1" input of multiplexer $204_1$, and the "0" input of multiplexers $204_0$ and $204_2$. Thus, XCMD<n> will now be clocked into flip-flop $202_1$, and flip-flops $202_0$ and $202_2$ will hold their past values. On the next cycle of XCLK and XCLK_, bit 2 of EN<0:2> will go high, which will select the "1" input of multiplexer $204_2$, and the "0" input of multiplexers $204_0$ and $204_1$. Thus, XCMD<n> will be clocked into flip-flop $202_2$, and flip-flops $202_0$ and $202_1$ will hold their past values. Since ring counter 148 is a three-bit ring counter, this cycle will then repeat itself. Thus, each of the enabled registers 200 operates to stretch out the amount of time the respective command bit is available from one cycle of the command capture clock to three cycles. In other embodiments, the length of ring counter 148 corresponds to the number of clock cycles the command signals are stretched out. For example, if the command bits are stretched out to only two clock cycles, then ring counter 148 would be only a two-bit ring counter.

Referring back to FIG. 3, each of captured command signals CMDn<0:2> is input to a corresponding one of multiplexers $146_n$. Each multiplexer $146_n$ is a 3×1 multiplexer that selects one bit of the respective multiple-bit captured command signal CMDn<0:2> in response to a three-bit select signal (SELECT<0:2>) 164. The output signals from the multiplexers $146_0$, $146_1$, $146_2$, $146_3$ are combined to form SCMD<0:3> signals 138 that, as illustrated in FIG. 2, are output to command decoder 134 for partial or full decoding.

Select signals (SELECT<0:2>) 164 are generated by ring counter 150, which is clocked by read clock signals RCLK_ and RCLK. While this use of read clock signals RCLK_ and RCLK causes SCMD<0:3> to be partially synchronized to the read clock domain, the SCMD<0:3> signals are not fully synchronized to the read clock domain until after being processed by output timing register 136 (FIG. 2). The operation of ring counter 150 is coordinated with the operation of ring counter 148 so that ring counter 150 selects a particular bit of the four CMDn<0:2> signals after ring counter 148 has selected that bit, and before ring counter 148 selects that bit again. This coordination of the ring counters is due to the operation of POR circuit 152, which is described in detail below.

In the embodiment of FIG. 3, ring counter 148 is driven by the positive edges of the cross clock (i.e., XCLK drives input C of ring counter 148), while ring counter 150 is driven by the negative edges of the read clock (i.e., RCLK_ drives input C of ring counter 150). Thus, ring counter 148 changes the enable signals (EN<0:2>) 162 off the positive edges of XCLK, while ring counter 150 changes the select signals (SELECT<0:2>) 164 off the negative edges of RCLK (as shown by the timing diagram of FIG. 5). Driving the ring counters 148 and 150 in this manner advantageously improves the timing margin and setup time for command data to pass through multiplexers $146_n$ and over to output timing register 136, which captures the decoded command data off the positive edges of RCLK. This increase in timing margin helps to increase the reliability of circuit device 100. In other embodiments, these circuits may be driven by other transitions of the clock signals.

The EN<0:2> signals are thus used in capturing the command bits in the enabled registers, and the SELECT<0:2> signals corresponding to the previous EN<0:2> signals are used to open up the multiplexers $146_n$ to transfer the command out on SCMD<0:3>. The SCMD<0:3> signals are similar to the XCMD<0:3> signals, except that they will be synchronized to the SELECT<0:2> signals driven by RCLK. Note that the SCMD<0:3> signals are not yet fully synchronized to RCLK since they have not yet been latched into a register driven by RCLK. Full synchronization of SCMD<0:3> to the RCLK domain is performed by output timing register 136, which is driven by the positive edge of RCLK. Also note that driving ring counter 150 on the negative edge of RCLK, while driving output timing register 136 on the positive edge of RCLK, reduces the latency of the signals passing through digital circuit 100. Greater margin is available by clocking both ring counter 150 and output timing register 136 on the same clock edge at the expense of longer latency through digital circuit 100. The outputs from output timing register 136 are now in the RCLK timing domain, and can then be used throughout the DRAM's internal circuits as control signals.

In an embodiment where the command bits are stretched out for only two clock cycles, each multiplexer $146_n$ would be only a 2×1 multiplexer having two data input signals (CMDn<0:1>) and a two-bit select input signal (SELECT<0:1>), and ring counter 150 would be a two-bit ring counter for generating that two-bit select signal. Similar variations can be made for other embodiments where the command bits are stretched out for other numbers of clock cycles, as would be apparent to a person of skill in the art.

Note that, in the embodiment of FIGS. 3 and 4 where commands are stretched out or held for three clock (i.e., XCLK) cycles, the clock is allowed to vary in both directions. In contrast, in an embodiment where the commands are only stretched out or held for two clock cycles, the clock would only be allowed to vary in one direction. Thus, stretching out the command signals for three clock cycles may be preferable since it provides three clock cycles of variation in which to transfer command signals from the XCLK timing domain to the RCLK timing domain, and allows the relative clock phase to shift to either the negative or positive directions from a zero mid-point. In other words, by holding the command for three clock cycles, both negative and positive shifts can be reliably handled.

The purpose of POR circuit 152 is to insure that, at some point in time after all the bits of a command (e.g., XCMD<0:3>) are captured in one of the three flip-flops of all of the enabled registers $144_0$, $144_1$, $144_2$, $144_3$, but before a new command is captured in that same flip-flop of all of the enabled registers three clock cycles later, the corresponding select input to the 3×1 multiplexers $146_0$, $146_1$, $146_2$, $146_3$ is selected in order to allow that captured command to pass through the 3×1 multiplexers. For example, assume ring counter 148 sets bit 0 of EN<0:2> to 1 so that flip-flops $202_0$ of all four enabled registers $144_0$, $144_1$, $144_2$, $144_3$ capture a four-bit command that is timed to the capture clock. This captured command will be available as bit 0 of the outputs from the four enabled registers for three cycles of the capture clock before flip-flops $202_0$ of the four enabled registers are used to capture another command. POR circuit 152 insures that multiplexers $146_0$, $146_1$, $146_2$, $146_3$ are opened up to pass the captured command stored in flip-flops $202_0$ at some point in time after EN<0> was set high to capture that command in flip-flops $202_0$, but before EN<0> becomes set high again to capture a new command in those flip-flops $202_0$.

The input signals to POR circuit 152 include RESET_ signal 142, cross clock signals (XCLK and XCLK_) 120, read clock signals (RCLK and RCLK_) 122, and bit 1 of enable signals (EN<1>) 162. The output signals from POR circuit 152 include a reset signal (RINGCNTR0R_) 166 for ring counter 148, and a reset signal (RINGCNTR1R_) 168 for ring counter 150. During a power-on reset, RESET_ signal 142 is low, and flip-flops 154, 156 and 158 (and ring counters 148 and 150) are reset. When RESET_ goes high, RESET_ is synchronized by XCLK_ and XCLK signals 120 using flip-flop 154 to generate a delayed reset signal 170. Delayed reset signal 170 is synchronized by XCLK_ and XCLK signals 120 using flip-flop 156 to generate the reset signal (RINGCNTR0R_) 166 for ring counter 148, such that ring counter 148 can start to run responsive to XCLK and XCLK_ after RINGCNTR0R_ goes high. Delayed reset signal 170 is synchronized by RCLK and RCLK_ signals 122 using flip-flop 158 to generate a second delayed reset signal 172. Second delayed reset signal 172 and EN<1> are the inputs to Muller C gate 160, which generates reset signal (RINGCNTR1R_) 168 for ring counter 150, such that ring counter 150 can start to run responsive to RCLK_ and RCLK after RINGCNTR1R_ goes high. Initially, when RESET_ is low, both inputs to Muller C gate 160 are low, and the output 168 from Muller C gate 160 keeps ring counter 150 reset. Then, after RESET_ goes high, the EN<1> input to Muller C gate 160 insures that the output 168 from Muller C gate 160 keeps ring counter 150 reset until EN<0> has been high and gone low. The output from Muller C gate 160 does not allow ring counter 150 to start to run in response to the RCLK_ and RCLK signals until EN<1> and signal 172 are both set. Thus, ring counter 150 will not begin to run until after ring counter 148 has already started to run. Once the output 168 from Muller C gate 160 is set (which allows ring counter 150 to start to run), that output signal remains set since signal 172 will remain set. Therefore, after ring counters 148 and 150 have been properly coordinated following a power-on reset by POR circuit 152, ring counters 148 and 150 will remain properly coordinated (since RESET_ will remain high). Ring counter 150 will now select a particular bit after ring counter 148 selects that bit, and before ring counter 148 selects that particular bit again.

Figure 5:
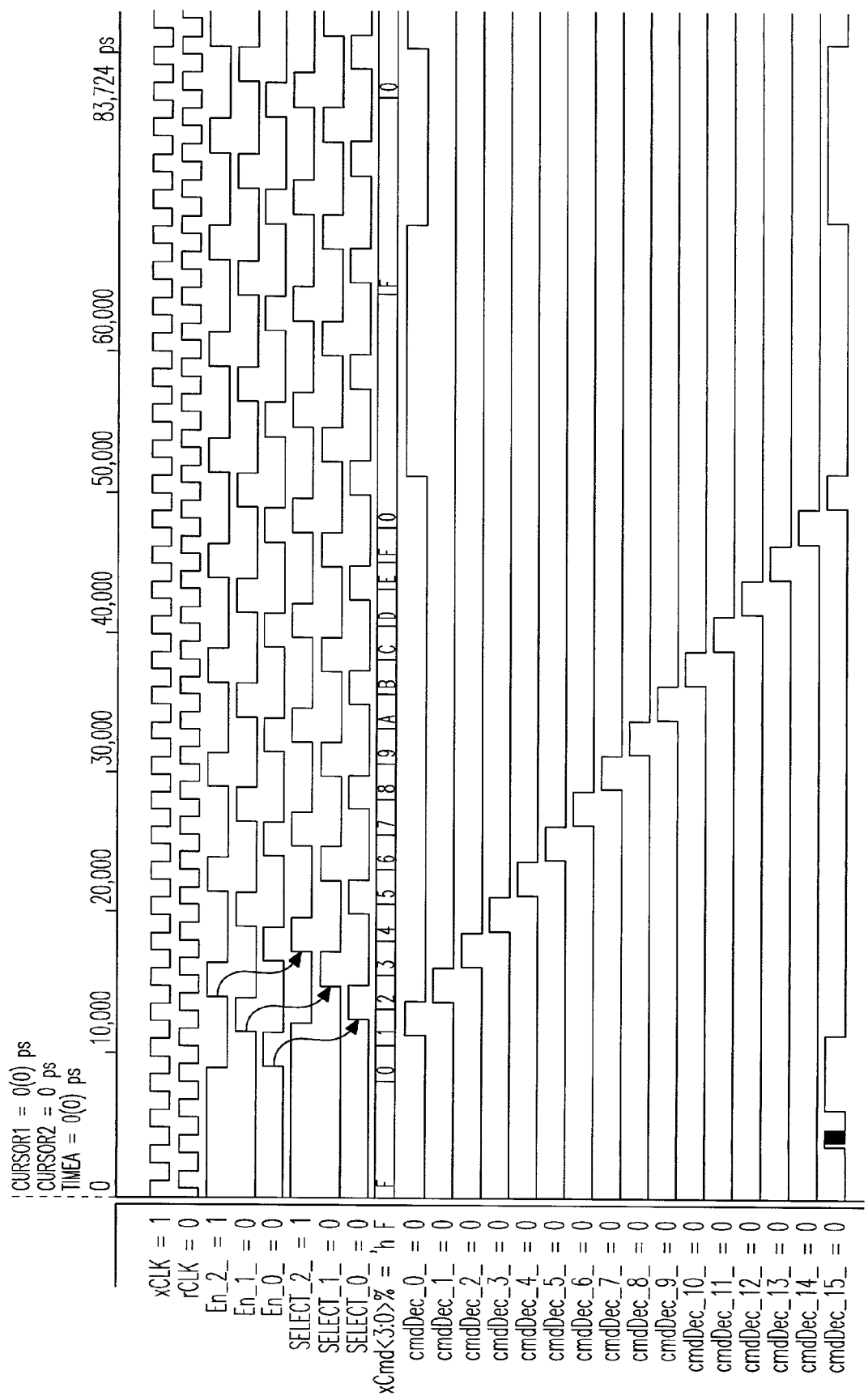
FIG. 5 is a timing diagram illustrating exemplary operation of the FIFO synchronizer with integrated decode shown in FIG. 2.

Referring to FIG. 5, operation of FIFO synchronizer with integrated decode 104 is illustrated by an exemplary timing diagram. As shown in the top two traces, the XCLK and RCLK clock signals have the same frequency, but are not in phase with each other. As noted above, the phase relationship between XCLK and RCLK is assumed arbitrary. The EN_2_, EN_1_ and EN_0_ traces show the states of enable signals (EN<0:2>) 162, which are output from ring counter 148 and clocked by XCLK and XCLK_ to repeat the three-bit ring counter sequence of $001_2$, $010_2$ and $100_2$. The SELECT_2_, SELECT_1_ and SELECT_0_ traces show the states of select signals (SELECT<0:2>) 164, which are output from ring counter 150 and clocked by RCLK_ and RCLK to also repeat the three-bit ring counter sequence of $001_2$, $010_2$ and $100_2$. However, as shown by the arrows from EN<0:2> to SELECT<0:2>, each SELECT<n> bit goes high only after the corresponding EN<n> bit goes high, and before that same EN<n> bit goes high again. This relationship between EN<0:2> and SELECT<0:2> reflects the coordination between the first and the second ring counters 148 and 150 that was described above. The XCMD<3:0> trace shows the state, in hexadecimal notation, of exemplary command signals 126 being input to the FIFO synchronizer with integrated decode 104. In this example, command signals XCMD<3:0> start at FH, and then cycle through each of its 16 states (i.e., 0 through FH). Finally, the CMDDEC_n_ traces show the states of the 16 decoded output signals 128. The CMDDEC_n_ traces reflect the decoded states of XCMD<3:0> signals 126, which have also been transferred from the XCLK timing domain to the RCLK timing domain.

As noted above, command decoder 134 partially or fully decodes the command signals to generate at least partially decoded command signals in a manner that depends on the requirements of peripheral logic/data path logic 106, and on the configuration of digital circuit 100. In the embodiment shown in FIG. 2, four command bits are fully decoded using a four-bit command decoder 134. In this case, the four command bits are "fully" decoded since command decoder 134 generates a unique decoded output for each of the 16 (i.e., $2^4$) possible combinations of inputs. In another embodiment, the command bits are only "partially" decoded. For example, it may be that only five combinations of the four command bits are valid for digital circuit 100, and that the other 11 combinations are invalid (and will not normally occur). In this case, the command decoder may only partially decode the four command signals to generate five unique decoded outputs.

More generally, the command decoder generates one or more than one decoded output signals in response to the command signal inputs. In some embodiments, the command decoder includes decode logic which generates one and only one output signal in response to each combination of input signals. In other embodiments, the command decoder includes decode logic which generates more than one output signal in response to each combination of input signals. In cases where the FIFO synchronizer with integrated decode is used for synchronizing and decoding non-command input signals, such as address signals or data signals, the command decoder is replaced by a "decoder" which performs the decoding which is required for the particular configuration of the circuit.

Figure 6:
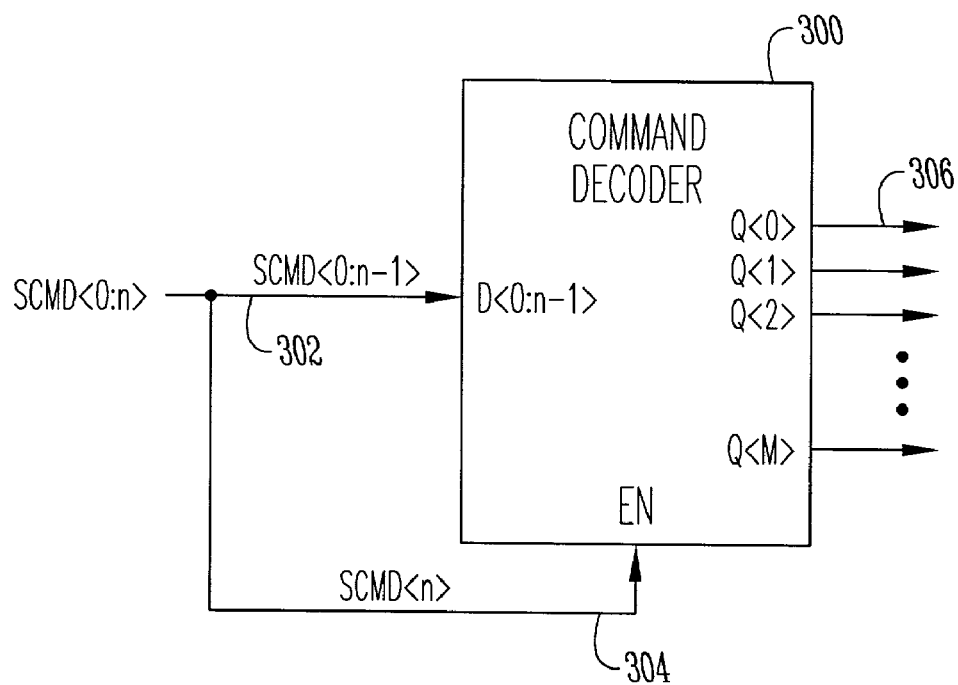
FIG. 6 is a schematic diagram illustrating another embodiment of the command decoder of FIG. 1, wherein the signals transferred from the first to the second timing domain include an enable signal (e.g., a chip select signal) for the digital circuit.

Referring to FIG. 6, a command decoder 300 according to another embodiment of the invention is illustrated. In this embodiment, it is assumed that the command signals XCMD<0:n> received by command receiver 132 includes command and enable signals. For example, as shown in FIG. 6, the SCMD<0:n> inputs to command decoder 300 may include the command signals SCMD<0:n−1> 302 and an enable signal SCMD<n> 304. Enable signal SCMD<n> has a first state in which the digital circuit 100 is enabled, and a second state in which the digital circuit is not enabled. For example, the enable signal may be a chip select signal for an integrated circuit device (e.g., a chip select signal for a DRAM). In this example, command decoder 300 partially or fully decodes the command signals SCMD<0:n−1> to generate one or more than one decoded command signal 306 if enable signal SCMD<n> indicates that the circuit is enabled, and inhibits decoding of the command signals SCMD<0:n−1> if enable signal SCMD<n> indicates that the circuit is not enabled. If decoding is inhibited, output timing register 136 does not output the one or the more than one decoded command signals 306. In an alternative embodiment, the enable signal is applied as an output enable input to output timing register 136, such that register 136 inhibits or disables the output of at least one decoded command signal 306.

Figure 7:
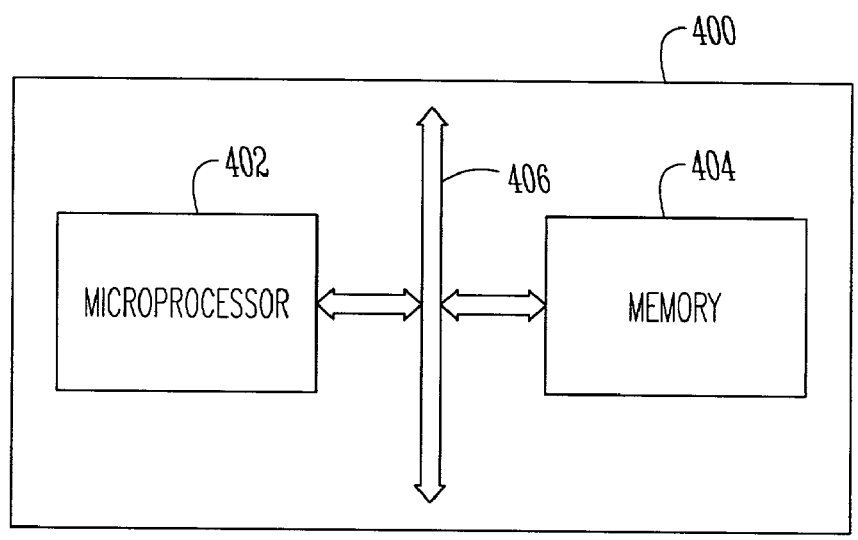
FIG. 7 is a schematic block diagram illustrating a processing system including a dynamic random access memory (DRAM) such as the DRAM that is shown in FIG. 1.

Referring to FIG. 7, in accordance with another embodiment of the invention, a processing system 400 includes a microprocessor 402, a memory 404, and a bus 406 that couples microprocessor 402 and memory 404 together. In this embodiment, memory 404 is a digital circuit in which command signals are at least partially decoded while being transferred from a first timing domain to a second timing domain as described above. In other embodiments, processing system 400 includes a plurality of memories 404, some or all of which are enabled (e.g., selected) by an enable (e.g., chip select) signal on bus 406.

In one embodiment, memory 404 is a DRAM memory device like that of FIG. 1, which receives three separate clock signals from bus 406. These clock signals include a first clock for timing command/address signals, a second clock for timing read data, and a third clock for timing write data. The device also includes internal synchronous circuitry, denoted as peripheral logic/data path logic 106 in FIG. 1, for performing functions such as accessing memory arrays, transferring data to I/O circuits in order to drive data out of the device, transferring data to I/O circuits in order to write data into the device, etc. To run this synchronous circuitry, one of the clocks being input to the device is selected. In one embodiment, the command/address clock (i.e., XCLK) is used only for capturing the command/address signals into command/address input latches. The write clock is used only for capturing the write data into write data latches at the DQ nodes. The read clock, in this embodiment, is used both for driving the latches for the data being output from the device, and for driving the peripheral logic/data path logic 106 for accessing the arrays. In other words, the read clock also serves as the DRAM internal system clock. Thus, the command/address and write clocks are used only for capturing signals, while the read clock is used both for reading signals and for driving the synchronous DRAM logic.

In this DRAM embodiment, then, the read clock is used to run the internal DRAM synchronous circuitry. After commands are captured in the command/address (XCLK) timing domain, the commands must be transferred consistently to the read clock domain. These transfers must be performed consistently despite variations in process, temperature and voltage. While the process may be the same for any one part, variations in voltage and temperature could adversely affect the relationship between the command/address clock and the read clock if a FIFO synchronizer circuit were not employed, such that the transfer of the command signals could make the DRAM device unreliable. In particular, DRAM devices typically have a specified latency requirement that defines the maximum amount of time from receipt of a command by the DRAM device until the DRAM device provides output data. This latency is specified in the DRAM's data sheet, and must be maintained regardless of variations in process, temperature and voltage. For example, a particular DRAM device could have a maximum latency requirement of 15 nsec, which must be met under all conditions. Even if the phase relationship between the read clock and the command/address clock changes, this latency requirement must always be met. One purpose of FIFO synchronizer with integrated decode 104 is to capture the command bits in the enabled registers of the command receiver 132 in the command/address clock domain, and then transfer the command bits to the output timing register to synchronize the command with the read clock domain. The integrated command decoder 134 advantageously uses the latency associated with this transfer to perform useful work.

CONCLUSION

Thus, digital circuit 100 including a FIFO synchronizer with integrated decode 104 has been described herein. FIFO synchronizer with integrated decode 104 includes command receiver 132 for receiving a plurality of command signals 126 operative in a first timing domain defined by cross clock XCLK 120, command decoder 134 coupled to command receiver 132 for at least partially decoding command signals 126 to generate at least one decoded signal 140, and output timing register 136 coupled to decoder 134 for outputting the at least partially decoded command signals in a second timing domain defined by read clock RCLK 122. In one embodiment, the transferred signals include command signals. In other embodiments, the transferred signals include command, address, data and/or other types of signals that need to be partially or fully decoded.

In one DRAM embodiment, FIFO synchronizer with integrated decode 104 is used for transferring command/address signals timed to a command capture clock to the timing domain of an array/core logic clock. The latency associated with the transfer of the command bus signals from the sending clock domain to the receiving clock domain, which depends on the frequency of the clocks and on the timing relationship between the two clocks, is advantageously used by the decoder to partially or fully decode the signals during the transfer. Thus, by inserting the decoder between the front and back ends of the FIFO synchronizer, the time that is typically wasted during the transfer between timing domains is used productively, rather than wasted. The resulting signals are partially or fully decoded signals, rather than signals directly transferred between timing domains.

The above description and the accompanying drawings are intended to be illustrative of the present invention, and not restrictive. Many other embodiments will be apparent to those of ordinary skill in the art upon reviewing the above description. The scope of the invention should therefore be determined with reference to the appended claims, along with the full scope of equivalents to which such claims are entitled.

What is claimed is:

1. An apparatus for transferring signals between timing domains, comprising:
    a receiver for receiving a plurality of signals operative in a first timing domain in accordance with a first clock signal;
    a decoder coupled to the receiver for at least partially decoding the signals to generate at least one decoded signal; and
    an output timing register coupled to the decoder for outputting the at least one decoded signal in a second timing domain in accordance with a second clock signal.

2. The apparatus of claim 1, wherein the plurality of signals include command signals and the at least one decoded signal includes at least one decoded command signal.

3. The apparatus of claim 1, wherein the plurality of signals include address signals and the at least one decoded signal includes at least one decoded address signal.

4. The apparatus of claim 1, wherein the first timing domain and the second timing domain have no predetermined phase relationship.

5. An apparatus for transferring signals between timing domains, comprising:
    a receiver for receiving a plurality of signals operative in a first timing domain in accordance with a first clock signal, the receiver including a multiple-bit enabled register for each of the plurality of signals, each of the multiple-bit enabled registers being clocked using a first clock signal;
    a decoder coupled to the receiver for at least partially decoding the signals to generate at least one decoded signal; and
    an output timing register coupled to the decoder for outputting the at least one decoded signal in a second timing domain in accordance with a second clock signal.

6. The apparatus of claim 5, wherein the receiver further includes a first ring counter for generating a multiple-bit enable signal, each of the bits of the enable signal being used for enabling clocking of one of the bits of the multiple-bit enabled registers.

7. The apparatus of claim 6, wherein the receiver further includes a multiplexer associated with each of the multiple-bit enabled registers for selecting one of the bits from the respective multiple-bit enabled register for output to the decoder.

8. The apparatus of claim 7, wherein the receiver further includes a second ring counter for generating a multiple-bit selection signal for each multiple-bit multiplexer.

9. The apparatus of claim 8, wherein the second ring counter selects a particular bit after the first ring counter selects the particular bit and before the first ring counter selects the particular bit again.

10. The apparatus of claim 5, wherein the output timing register is clocked using a second clock signal having no phase relationship with the first clock signal.

11. An apparatus for transferring signals between timing domains, comprising:
    a receiver for capturing a plurality of signals timed to a capture clock;
    a decoder coupled to the receiver for at least partially decoding the signals to generate at least one decoded signal; and
    an output timing register coupled to the decoder for synchronizing the at least one decoded signal to a logic clock.

12. The apparatus of claim 11, wherein the plurality of signals include command signals and the at least one decoded signal includes at least one decoded command signal.

13. The apparatus of claim 11, wherein the plurality of signals include address signals and the at least one decoded signal includes at least one decoded address signal.

14. The apparatus of claim 11, wherein the capture clock and the logic clock have no predetermined phase relationship.

15. An apparatus for transferring signals between timing domains, comprising:
    a FIFO synchronizer having a front end and a back end, wherein the front end is for capturing a plurality of signals operative in a first timing domain in accordance with a first clock signal, and the back end is for synchronizing at least one decoded signal to a second timing domain in accordance with a second clock signal; and
    a decoder coupled between the front and back ends of the FIFO synchronizer, the decoder for decoding the captured signals to generate the at least one decoded signal.

16. The apparatus of claim 15, wherein the plurality of signals include command signals and the at least one decoded signal includes at least one decoded command signal.

17. The apparatus of claim 15, wherein the plurality of signals include address signals and the at least one decoded signal includes at least one decoded address signal.

18. The apparatus of claim 15, wherein the front end of the FIFO synchronizer includes a multiple-bit enabled register for capturing each of the plurality of signals.

19. The apparatus of claim 18, wherein the front end of the FIFO synchronizer further includes a first ring counter for enabling each bit of the multiple-bit enabled register.

20. The apparatus of claim 19, wherein the front end of the FIFO synchronizer further includes a multiplexer associated with each multiple-bit enabled register for selecting one of the bits from the respective multiple-bit enabled register for output to the decoder.

21. The apparatus of claim 20, wherein the front end of the FIFO synchronizer further includes a second ring counter for generating a selection signal for each multiplexer.

22. An integrated circuit device having a sending clock domain and a receiving clock domain, comprising:
   a receiver for receiving a plurality of command signals operative in the sending clock domain in accordance with a sending clock signal;
   a decoder coupled to the receiver for at least partially decoding the command signals to generate at least one decoded command signal; and
   an output timing register coupled to the decoder for outputting the at least one decoded command signal in the receiving clock domain in accordance with a receiving clock signal.

23. The integrated circuit device of claim 22, further comprising a DRAM array.

24. The integrated circuit device of claim 23, wherein the plurality of command signals command a DRAM operation which is selected from the group of DRAM operations consisting of a read operation, a write operation and a refresh operation.

25. The integrated circuit device of claim 22, wherein the sending clock domain and the receiving clock domain have no predetermined phase relationship.

26. An integrated circuit device having a sending clock domain and a receiving clock domain, comprising:
   a receiver for receiving a plurality of command signals operative in the sending clock domain and fix receiving an enable signal with a first state in which the integrated circuit device is enabled and a second state in which the circuit device is not enabled;
   a decoder coupled to the receiver for at least partially decoding the command signals to generate at least one decoded command signal if the circuit device is enabled; and
   an output timing register coupled to the decoder for outputting the at least one decoded command signal in the receiving clock domain if the circuit device is enabled.

27. The integrated circuit device of claim 26, wherein the decoder inhibits decoding of the command signals if the circuit device is not enabled.

28. The integrated circuit device of claim 26, wherein the output of the at least one decoded command signal is inhibited if the circuit device is not enabled.

29. The integrated circuit device of claim 26, wherein the enable signal is a chip select signal.

30. An apparatus for transferring signals between timing domains, comprising:
   means for receiving a plurality of signals operative in a first timing domain in accordance with a first clock signal;
   means for at least partially decoding the signals to generate at least one decoded signal; and
   means for outputting the at least one decoded signal in a second timing domain in accordance with a second clock signal.

31. The apparatus of claim 30, wherein the plurality of signals include command signals and the at least one decoded signal includes at least one decoded command signal.

32. The apparatus of claim 30, wherein the plurality of signals include address signals and the at least one decoded signal includes at least one decoded address signal.

33. A method of transferring signals between timing domains of a digital circuit, comprising:
   receiving a plurality of signals operative in a first timing domain in accordance with a first clock signal;
   at least partially decoding the signals to generate at least one decoded signal; and
   outputting the at least one decoded signal in a second timing domain in accordance with a second clock signal.

34. The method of claim 33, wherein receiving the plurality of signals includes receiving command signals, and at least partially decoding the signals includes generating at least one decoded command signal.

35. The method of claim 33, wherein receiving the plurality of signals includes receiving address signals, and at least partially decoding the signals includes generating at least one decoded address signal.

36. The method of claim 33, wherein the first timing domain and the second timing domain have no predetermined phase relationship.

37. A method of transferring signals between timing domains of a digital circuit, comprising:
   capturing a plurality of signals in accordance with a capture clock of the digital circuit;
   at least partially decoding the signals to generate at least one decoded signal; and
   synchronizing the at least one decoded signal to a logic clock of the digital circuit.

38. The method of claim 37, wherein capturing the plurality of signals includes capturing command signals, and at least partially decoding the signals includes generating at least one decoded command signal.

39. The method of claim 37, wherein capturing the plurality of signals includes capturing address signals, and at least partially decoding the signals includes generating at least one decoded address signal.

40. The method of claim 37, wherein the capture clock and the logic clock have no predetermined phase relationship.

41. A method of transferring signals between timing domains of a digital circuit using a first-in first-out (FIFO) synchronizer having a front end and a back end, compnsing:
   capturing a plurality of signals operative in a first timing domain at the front end of the FIFO synchronizer in accordance with a first clock signal;
   transfening the signals from the front end of the FIFO synchronizer to a decoder;
   decoding the signals at the decoder to generate at least one decoded signal;
   transferring the at least one decoded signal to the back end of the FIFO synchronizer; and
   synchronizing the at least one decoded signal to a second timing domain at the back end of the FIFO synchronizer in accordance with a second clock signal.

42. The method of claim 41, wherein capturing the signals includes capturing command signals, and decoding the signals includes generating at least one decoded command signal.

43. The method of claim 41, wherein capturing the signals includes capturing address signals, and decoding the signals includes generating at least one decoded address signal.

44. The method of claim 41, wherein capturing the signals includes clocking each signal into a multiple-bit enabled register using a first clock signal.

45. The method of claim 44, wherein synchronizing the at least one decoded signal includes inputting the at least decoded signal to an output timing register clocked using a second clock signal with no predetermined phase relationship with the first clock signal.

46. A method of transferring command signals between a sending clock domain and a receiving clock domain of an integrated circuit device, comprising:
- receiving a plurality of command signals operative in the sending clock domain of the integrated circuit device in accordance wit a sending clock signal;
- at least partially decoding the command signals to generate at least one decoded command signal; and
- outputting the at least one decoded command signal in the receiving clock domain of the integrated circuit device in accordance with a receiving clock signal.

47. The method of claim 46, wherein the integrated circuit device includes a dynamic random access memory (DRAM).

48. The method of claim 47, wherein receiving the command signals includes receiving signals that command a DRAM operation selected from the group of DRAM operations consisting of a read operation, a write operation and a refresh operation.

49. The method of claim 46, wherein the sending clock domain and the receiving clock domain have no predetermined phase relationship.

50. A method of transferring command signals between a sending clock domain and a receiving clock domain of an integrated circuit device, comprising:
- receiving a plurality of command signals operative in the sending clock domain of the integrated circuit device;
- receiving an enable signal with a first state in which the integrated circuit device is enabled and a second state in which the integrated circuit device is not enabled; and
- if the enable signal indicates that the integrated circuit device is enabled, decoding the command signals to generate at least one decoded command signal and outputting the at least one decoded command signal in the receiving clock domain of the circuit device.

51. The method of claim 50, further comprising, if the enable signal indicates that the integrated circuit device is not enabled, inhibiting decoding of the command signals.

52. The method of claim 50, further comprising, if the enable signal indicates that the integrated circuit device is not enabled, inhibiting outputting of the at least one decoded command signal.

53. The method of claim 50, wherein the enable signal is a chip select signal.

* * * * *